United States Patent
Guthridge

(10) Patent No.: US 9,805,321 B2
(45) Date of Patent: Oct. 31, 2017

(54) ECO SCORE ANALYTICS SYSTEM

(75) Inventor: Gregory Sean Guthridge, Vancouver (CA)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1195 days.

(21) Appl. No.: 13/267,620

(22) Filed: Oct. 6, 2011

(65) Prior Publication Data

US 2012/0095794 A1 Apr. 19, 2012

Related U.S. Application Data

(60) Provisional application No. 61/393,630, filed on Oct. 15, 2010.

(51) Int. Cl.
*G06Q 10/00* (2012.01)
*G06Q 10/06* (2012.01)

(52) U.S. Cl.
CPC .................. *G06Q 10/063* (2013.01)

(58) Field of Classification Search
None
See application file for complete search history.

(56) References Cited

U.S. PATENT DOCUMENTS

| | | | |
|---|---|---|---|
| 6,169,979 B1 * | 1/2001 | Johnson | 705/412 |
| 6,578,005 B1 * | 6/2003 | Lesaint et al. | 705/7.14 |
| 6,925,441 B1 * | 8/2005 | Jones et al. | 705/7.33 |
| 6,957,113 B1 * | 10/2005 | Logsdon et al. | 700/100 |

OTHER PUBLICATIONS

International Congress on Interdisciplinary Behaviour and Social Sciences (2nd : 2013 : Indonesia. Recent trends in social and behaviour sciences [electronic resource] : proceedings of the 2nd International Congress on Interdisciplinary Behaviour and Social Sciences 2013, (ICIBSoS 2013), Jakarta, Indonesia, Nov. 4-5, 2013.*

* cited by examiner

*Primary Examiner* — David Rines
*Assistant Examiner* — Nancy Prasad
(74) *Attorney, Agent, or Firm* — Mannava & Kang, P.C.

(57) ABSTRACT

A system and method are configured to perform eco score analytics for an energy program associated with potential targets. A factor profile initiator determines categories and subcategories of parameters to be included in a model for the energy program based on attributes of the energy program. The model is built and used to determine eco scores for the potential targets. The eco scores estimate propensity of the potential target to participate in the energy program. A campaign engine determines ranking of the scores and a subset of the potential targets are selected as targets for the energy program based on the rankings.

15 Claims, 8 Drawing Sheets

| customer | Demographic Characteristics | Demographic Value | Codes | model 1 weights | model 2 weights | model 3 weights | model 1 score | model 2 score | model 3 score |
|---|---|---|---|---|---|---|---|---|---|
| 1 | Heat Type | gas | a1 | % | % | % | | | |
| | Residents | 5 | d5 | % | % | % | | | |
| | Relative Usage | 0.1 | e5 | % | % | % | #value! | #value! | #value! |
| | House Type | duplex | b2 | % | % | % | | | |
| | Shared Bill | yes | c1 | % | % | % | | | |
| 2 | Heat Type | electric | a2 | % | % | % | | | |
| | Residents | 2 | d2 | % | % | % | | | |
| | Relative Usage | -0.3 | e13 | % | % | % | #value! | #value! | #value! |
| | House Type | sfh | b1 | % | % | % | | | |
| | Shared Bill | no | c2 | % | % | % | | | |
| 3 | Heat Type | heating oil | | % | % | % | | | |
| | Residents | 6 | | % | % | % | | | |
| | Relative Usage | +0.4 | | % | % | % | #value! | #value! | #value! |
| | House Type | apartment | | % | % | % | | | |
| | Shared Bill | no | | % | % | % | | | |
| 4 | Heat Type | gas | | % | % | % | | | |
| | Residents | 2 | | % | % | % | | | |
| | Relative Usage | -0.2 | | % | % | % | #value! | #value! | #value! |
| | House Type | other | | % | % | % | | | |
| | Shared Bill | no | | % | % | % | | | |
| 5 | Heat Type | other | | % | % | % | | | |
| | Residents | 1 | | % | % | % | | | |
| | Relative Usage | +0.7 | | % | % | % | #value! | #value! | #value! |
| | House Type | apartment | | % | % | % | | | |
| | Shared Bill | yes | | % | % | % | | | |

| Heat Type | |
|---|---|
| Gas | a1 |
| Elec | a2 |
| Heating oil | a3 |
| Other | a4 |

FIG. 2C

| Number of residents | |
|---|---|
| 1 | d1 |
| 2 | d2 |
| 3 | d3 |
| 4 | d4 |
| 5 | d5 |
| 6 | d6 |
| >6 | d7 |

FIG. 2D

| Relative Usage | |
|---|---|
| >0.8 | e1 |
| 0.5 | e2 |
| 0.3 | e3 |
| 0.2 | e4 |
| 0.1 | e5 |
| 0.05 | e6 |
| 0 | e7 |
| -0.05 | e8 |
| -0.1 | e9 |
| -0.2 | e10 |
| -0.3 | e11 |
| -0.5 | e12 |
| <-0.8 | e13 |

FIG. 2E

| House Type | |
|---|---|
| sfh | b1 |
| duplex/townhome | b2 |
| apartment | b3 |
| other | b4 |

FIG. 2F

| Shared Bill | |
|---|---|
| Yes | c1 |
| No | c2 |

| customer | Demographic Characteristics | Demographic Value | model 1 score | model 2 score | model 3 score |
|---|---|---|---|---|---|
| 1 | Heat Type<br>Residents<br>Relative Usage<br>House Type<br>Shared Bill | heating oil<br>5<br>0.15<br>duplex<br>yes | 0.2580 | 0.2770 | 0.2585 |

FIG. 3A

| customer | Demographic Characteristics | Demographic Value | model 1 score | model 2 score | model 3 score |
|---|---|---|---|---|---|
| 2 | Heat Type<br>Residents<br>Relative Usage<br>House Type<br>Shared Bill | electric<br>2<br>-0.3<br>sfh<br>no | 0.4180 | 0.3470 | 0.4585 |

FIG. 3B

| Factor | Attribute | value | Eco Score | Priority | weight | Rationale |
|---|---|---|---|---|---|---|
| Billing class | residential | yes | Higher | n/a | 96 | only target residential for phase 1 |
| apartment or house | apartment or house | apartment | Lower | H | 96 | in apartment, consumptions tend to be lower and you're not always paying for utilities |
| Rent or own | landlord agreement | rent | Lower | H | 90 | when renting, you're not always paying for utilities |
| relative usage (cluster segmentation) | % out of range compared to similar premises | Higher | Higher | H | | Compared to the neighborhood with similar premises, is the customer consuming more? |
| Historical usage | % fluctuation | Higher | Higher | H | | Has the customer been fluctuating in his/her consumption recently? |
| Historical usage | % increase | Higher | Higher | H | | has the customer been increasing his/her consumption recently? |
| Aggregate usage | % out of range compared to similar customers | Higher | Higher | H | | Compared to similar customers, is the customer consuming more? |
| How long at the premise | | Higher | Higher | M | | Has the customer's behavior set in stone? |
| Zip code/ city | "Greenness" of the neighborhood | Higher | Higher | H | | Which neighborhood is more green? |
| Contact history | # of high bill inquiries | Higher | Higher | M | | |
| | # of inquiries regarding EE programs | Higher | Higher | M | | |
| | # of complaints | Higher | Lower | M | | |
| Date of birth | | TBD | | M | | The older the customer is, the more (price sensitivity) OR less (greenness) likely the customer will be interested |

FIG. 4

| Factor | Attribute | value | Eco Score | Priority weight | Rationale |
|---|---|---|---|---|---|
| Billing program | Budget billing | Yes | Lower | M | If the customer is on the levelized payment plan (budget billing), s/he is likely to be price sensitive |
| Payment program | Direct debit | Yes | Lower | M | If the customer is on direct debit, s/he is less likely to be price sensitive |
| Credit score | | Higher | Lower | M | The higher the customer's credit score is, s/he is less likely to be price sensitive |
| Billing program | Paperless billing | Yes | Higher | M | If the customer is on paperless billing, the customer values convenience |
| Special needs/ life support | | Yes | Lower | M | If the customer has special needs, the customer is less likely to be interested in demand side management |
| Sq footage | | Higher | Higher | H | Larger premise -> higher consumption -> more interest in managing demand |
| # of people living in the household | | Higher | Higher | H | Higher the number of people living at the premise -> higher consumption -> more interest in managing demand |
| Third-party paying the bill | | Yes | Lower | H | If someone else is paying the bill, not likely to be price sensitive |
| EE program participation | | yes | Higher | M | Already participating -> may be interested in other programs |
| EE device | | yes | Higher | M | Already green -> may be interested in other programs |

FIG. 4 (cont'd)

ECO SCORE ANALYTICS SYSTEM

PRIORITY

The present application claims priority to U.S. provisional patent application Ser. No. 61/393,630 filed on Oct. 15, 2010, which is incorporated by reference in its entirety.

BACKGROUND

Energy conservation and greenhouse gas emission reduction are important for individuals and entities of all sizes, from small corporations and non-governmental entities to large multinational conglomerates and governments at all levels. By decreasing the total energy consumption of consumers, or by influencing consumers to adopt more efficient energy types (i.e., green energy sources), energy conservation grows and greenhouse gas emission may be reduced. Another factor is that increased energy conservation indirectly enhances the development of renewable energy sources.

Many factors can influence how energy is utilized by individual consumers, entities, and segments of the population. The consumption of energy and/or other resources may be minimized through influencing certain consumer behaviors, especially consumer behaviors associated with high consumption or waste. One way by which consumer behaviors may be influenced is through directing information campaigns and educational programs to targets (e.g., individuals, entities, and/or population segments) which consume energy and/or other resources.

However, implementing information campaigns and educational programs is expensive and resources for such campaigns and programs are limited. Furthermore, the propensities can vary significantly among potential targets for favorably receiving such information and using it in a way to conserve energy or other resources. Furthermore, the waste associated with channeling information to less effective targets, such as those having an insignificant or zero propensity for favorably receiving and/or using the information needs to be avoided.

BRIEF DESCRIPTION OF DRAWINGS

Embodiments are described in detail in the following description with reference to the following figures.

FIGS. 2A-F illustrates examples of models, according to an embodiment;

FIGS. 3A-B illustrate examples of eco scores, according to an embodiment;

FIG. 4 illustrates an example of a data structure that may be used to organize input data, according to an embodiment;

SUMMARY

Figure 1:
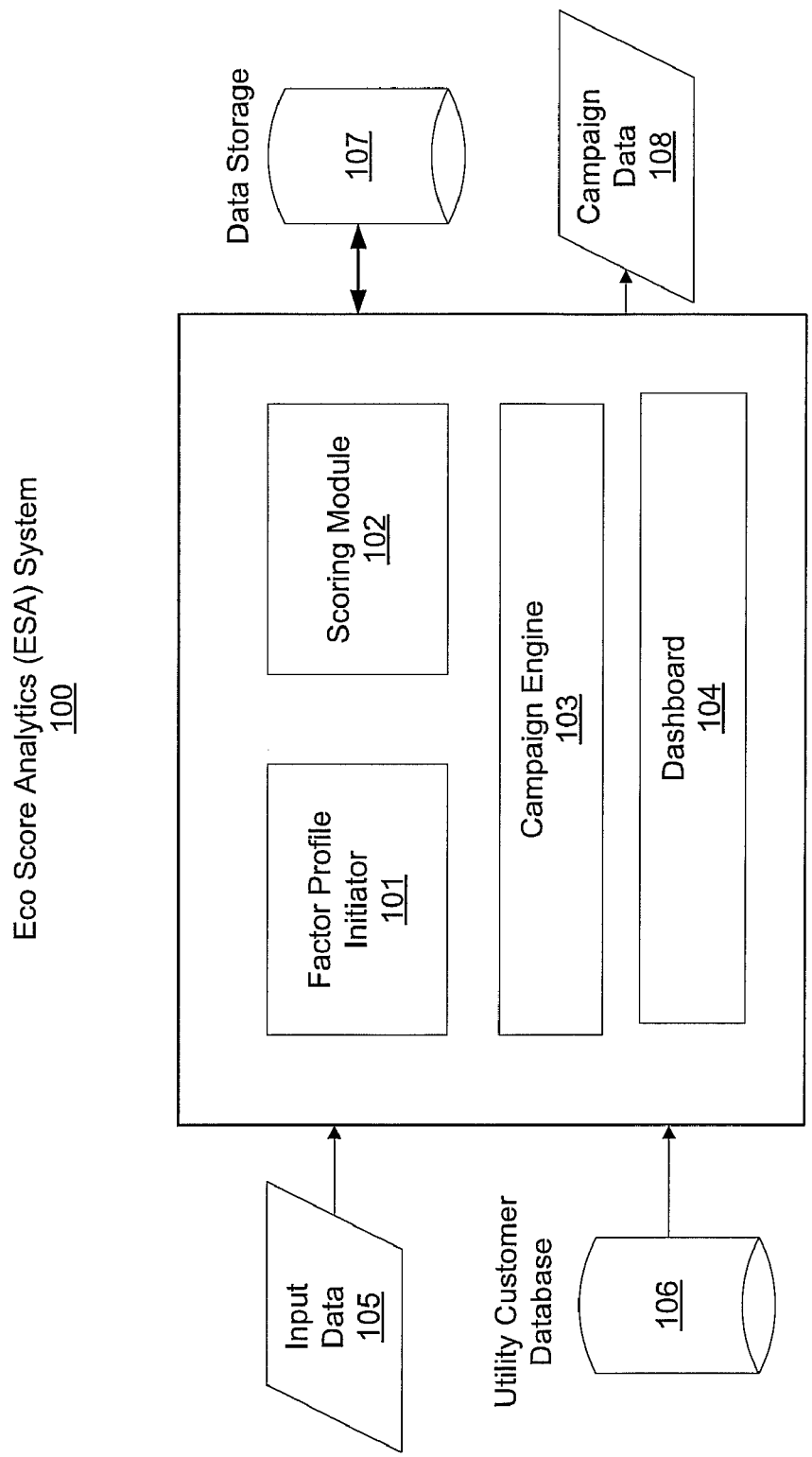
FIG. 1 illustrates an eco score analytics (ESA) system, according to an embodiment.

According to embodiments, a system and method are configured to perform eco score analytics for an energy program associated with potential targets. A factor profile initiator determines categories and subcategories of parameters to be included in a model for the energy program based on attributes of the energy program. The model is built and used to determine eco scores for the potential targets. The eco scores estimate propensity of the potential target to participate in the energy program. A campaign engine determines ranking of the scores and a subset of the potential targets are selected as targets for the energy program based on the rankings. One or more steps of the method may be embodied as machine readable instructions executed by a processor to perform the method.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments. Furthermore, different embodiments are described below. The embodiments may be used or performed together in different combinations.

ESA may include estimating and analyzing a potential target's reaction to an energy program. An energy program (also referred herein as a program) may include providing information and/or offerings related to energy and/or the environment. The energy program may be implemented to improve energy conservation. The ESA may estimate whether a potential target will favorably react and/or estimate a propensity to participate in an energy program so the potential targets likely to have the greatest interest and participation in the program can be included in the program. The estimation may be determined by measuring parameters associated with the ESA. In one embodiment, the parameters may be used to establish a model to estimate reaction to an energy program, which may include a propensity to participate in the energy program. The model may include assigned weights for a profile category of input data associated with each target. A potential target, for example, may include an individual consumer, entity or population segment. The potential target may include a customer of a utility company.

As indicated above, the energy programs may be implemented to improve energy conservation. For example, an energy program may promote the use of renewable energy sources through the distribution of energy conservation information and/or subsidies. Subsidies may be in the form of reduced energy rates, tax incentives, etc. By decreasing the total energy consumption of consumers, or by influencing consumers to adopt more efficient energy types (i.e., green energy sources), energy conservation grows and greenhouse gas emission may be reduced. Also increased energy conservation may indirectly enhance the development of renewable energy sources. Another example of an energy program is a smart meter program. The smart meter program may include implementing sensors and power control devices that measure and control power consumption, provide load management and may be used to reduce power consumption.

The ESA system 100 illustrated in FIG. 1 enables its users to effectively perform precise, accurate and efficient ESA. This enables the ESA system user to quantify the propensity of individuals, entities and population segments as potential targets for favorably receiving and reacting to an energy program.

In performing ESA, according to an embodiment, the ESA system 100 utilizes input data and parameters to quantify the propensity of the targets to favorably receive and use information from programs to establish a screening profile and models associated with the potential targets and the programs. By utilizing the input data and parameters, the ESA system 100 may perform precise, accurate and efficient ESA to produce an eco score associated with a potential target. The parameters adopted in developing an eco score enhances both the accuracy and the precision of the eco score in quantifying the propensity of each potential target for favorably reacting to a given information campaign or educational program. An eco score may include a measure of an estimate of a potential target's propensity to participate in an energy program.

The ESA system 100 may determine multiple eco score profiles for an individual utility consumer or other type of potential target. A different eco score may be associated with each different program. This enables the user of the ESA system 100 to develop a detailed profile of a utility consumer's different propensities to respond to different programs that may be advertized or promoted by the ESA system user. By way of example, a utility company or a government agency implementing an energy program may use the ESA system 100 to identify targets for the energy program that would likely have the greatest interest in the program.

The ESA system 100 may also be utilized as a tool to identify utility consumers having a measurable potential for providing value to the ESA system user. The utility consumers having a higher propensity to adopt or conform to beneficial behaviors may be identified using the ESA system. One example is relevant to utility customers in a high energy utilization area. The ESA system 100 may identify those users who are more likely to participate in energy conservation programs, or to react in real-time to notices from the ESA system user to temporarily cease or lower energy usage in a peak usage period. The ESA system 100 may profile customers in those regions having a potential for energy usage overload in order to reduce power consumption in those regions.

The ESA system 100 may also quantify ongoing participation in energy programs as a part of an eco score profile for a utility customer. Historical data tracking of customer participation in energy conservation programs may be taken from a utility customer profile database or a utility smart reader associated with the utility customer and then used to generate an eco score. Similarly, the eco scores generated using the historical data may then be stored with the utility customer profiles in a utility customer profile database and a data storage in the ESA system 100. In using the ESA system 100 in this way, the potential value of select customers may be identified based on the propensity of the customer to cooperate with the ESA system user in energy conservation programs or other energy conservation efforts.

FIG. 1 illustrates an ESA system 100, according to an embodiment. The ESA system 100 includes a factor profile initiator 101, a scoring module 102, a campaign engine 103, a dashboard 104 and a data storage 107. The ESA system 100 receives input data 105. The input data 105 may include any data used by the ESA system 100 to perform ESA and other functions, including data from a source data base, such as utility customer database 106. The data storage 107 may store the input data 105 and any data used or generated by the ESA system 100. The data storage 107 may include a database, an online analytical processing system or another type of data storage system. The input data 105 may be provided from one or more sources. One source may include a utility customer database 106 that includes customer profiles and energy usage data. Also, the input data 105 may include data entered by a user through a user interface, such as the dashboard 104.

The input data 105 may include parameters utilized in the ESA system 100 for processing data from the utility customer database 106 and other sources. The factor profile initiator 101 may determine profiles of potential targets, parameters and weights for parameters, as further described below, which are used to calculate eco scores for different programs. The profiles may include the parameters. Non-limiting examples of parameters, including categories and subcategories of the parameters, determined from the input data 105 may include the following: heating type such as gas, electric, heating oil, or other; housing type such as single family home, duplex/townhome, apartment, or other; shared billing; billing class such as residential or commercial; apartment or house (e.g., in apartments, consumptions tend to be lower or renters may not always pay for utilities); and rent or own.

Other examples of parameters, some of which may be calculated by the factor profile initiator 101 from other input data include the following: relative usage (cluster segmentation) which may include the percentage out of range compared to similar premises or compared to the neighborhood with similar premises to determine if the customer is consuming more; historical usage percent fluctuation and historical usage percent increase, which may be used to determine whether the customer has been fluctuating or increasing in consumption recently; and aggregate usage percentage out of range compared to similar customers, which can indicate if the customer is consuming more that other similar customers.

Other examples of parameters may include length of time at the premises; greenness of the location; contact history related to consumption such as number of high bill inquiries, number of inquiries regarding energy efficiency programs, or number of complaints; age of customer and education, which may correlate to likeliness to favor certain programs; billing program or budget billing which may indicate the customer is on a leveled payment plan (budget billing) and is less likely to be price sensitive; payment program direct debit which indicates if the customer is on direct debit and may be less likely to be price sensitive; credit score, e.g., the higher the customer's credit score the less likely the customer may be price sensitive; billing method such as electronic versus mailing; special needs/life support, e.g., if the customer has special needs, the customer may be less likely to be interested in demand side management; size of premises; number of people in the premises, e.g., larger sized premises or premises with more people may be more interested in managing demand; third-party paying the bill, if another is paying the bill, the customer may not likely be interested in managing demand; energy efficiency program participation, already participating, may be interested in other programs; and current use of energy efficiency devices, e.g., if the customer is already green they may be interested in other programs.

The input data 105 may also include data collected from smart metering systems. These systems may include sensors for capturing energy consumption at the appliance level, at the customer premises level or at other aggregated levels. These systems may also include devices for controlling power consumption. The information captured from these systems may be used to create an energy consumption profile for a utility customer and these profiles may be used to create models for energy programs.

The factor profile initiator 101 determines parameters from the input data 105 to be used in models for calculating eco scores for different programs. A factor profile comprises a set of parameters to be used to calculate eco scores for a particular program. The factor profile initiator 101 also determines a model for each program. In one example, the model may include the factor profile for the program and weights for each parameter in the factor profile. The model may be used to calculate eco scores for the program. Parameters and weights may be determined based on their relevancy to calculating a propensity of a potential target to participate, adopt or show interest in a program. Also, a model and factor profile may be used to calculate scores for multiple different programs or only used for one program. Also, different users may have different models. For example, different utility programs may administer similar programs but may utilize different models for their programs. Each user can control which parameters are used in their models and can control the weights assigned to parameters.

The factor profile initiator 101 may also select different parameters for a model based on analysis of historic data. Actual enrollment data may be used to improve the estimates of the propensity of potential targets to participate in a program. For example, the factor profile initiator 101 may identify a group of the individuals and entities that participated in a previous program or are currently participating in an existing program and identify common characteristics for the group. The common characteristics are used to select parameters. For example, the factor profile initiator 101 may determine that common characteristics for individuals that participated in the program include age greater than 40 and household income greater than $150,000.00. These common characteristics are used to select parameters and weights for a model for the current program or a new program to be implemented that is determined to have similarities with the current program. For example, age and household income parameters are selected. If the parameter value for age is greater than 40, then it is given a greater weight than an age below the 40 year old threshold. Similarly, if the parameter value for household income is greater than $150,000.00, then it is given a greater weight than a household income below the $150,000.00 threshold.

The scoring module 102 calculates scores for energy programs. A score may be calculated for each potential target or a group of potential targets for each program. A potential target may be an individual, an entity, etc. For example, a potential target may be a customer of a utility company, which may be an individual or a business that is charged for their consumption of energy provided by the utility company. The scores may be used to select potential targets to be included or targeted for each program.

The scoring module 102 may also calculate a composite score that takes into consideration the targets propensity to participate in a program and efficiency of the program. For example, efficiency of the program may be determined as a function of how much impact a target's participation in the program will have on the grid. For example, a program designed to reduce power consumption during peak demand periods may result in a higher grid efficiency than a general renewable energy educational program that mainly distributes information in a campaign to educate customers on energy conservation. Efficiency may also be based on the potential target. For example, if the potential target is a large business that consumes a large amount of power, then the efficiency score for that potential target may be greater than a single family home which consumes much less energy because reduction in consumption for the large business may result in a greater reduction of the load on the grid during peak demand times. The composite score may be a calculated from an efficiency score and an eco score. In one example, the scores may be combined to create the composite score. Thus, as described above, the scoring module 102 may calculate a score for individual customers to indicate a propensity towards a specific program. The scoring module 102 may calculate efficiency scores that identify the customers that may have the greatest or significant impact on overall load management. Each efficiency score may represent an impact a potential target may have on load management of power demand which may be managed by the utility. The scoring module 102 may calculate a composite score from the efficiency score and eco score for a customer.

The campaign engine 103 generates campaign data 108. The campaign data 108 may include the selected targets, eco scores, factor profiles and other data. The campaign data 108 may be provided to other systems that implement the energy programs. For example, the other systems may send information for the energy programs to the selected targets. Also, the campaign engine 103 may generate reports of the campaign data 108, which are viewable through the dashboard 104. The dashboard 104 is a user interface whereby users of the ESA system 100 may input data and view data for the ESA system 100. The dashboard 104 may be included in a graphic user interface that may be viewed remotely, for example, via the Internet. Reporting may also include mediums other than the dashboard 104. For example, the ESA system 100 may generate alerts and other messages which are transmitted to a user through a cellular network or other network. The messages may include emails, text messages, phone calls, etc.

FIGS. 2A-F shows examples of models for eco score calculations. In these examples the models have the same parameters, which are heat type, number of residents, consumption compared to average, home type and shared bill. However, different models may have different parameters.

In FIG. 2A, the column shown as demographic characteristics identifies the parameters. Values for the parameters are determined for each of the customers 1-5. For example, for customer 1, respective values for the parameters heat type, number of residents, consumption compared to average (difference), home type and shared bill are the following: gas; 5; 0.1; duplex; and yes. The values may be determined from the input data 105, which may include customer profiles. Codes may be used to represent parameter values as shown in the next column. Examples of codes are shown in FIGS. 2B-F. In the examples shown in FIG. 2A, the models are distinguished from each other based on their weights, which may be included in the model weight columns. A weight may be provided for each parameter as well as for each model. The actual weights are not shown but would be included in the columns for the model weights. A model score is calculated for each customer and for each model. Each model may be for a particular program. The actual scores are not shown but would be included in the model score columns. The scores may be eco scores for each customer calculated from the weights and corresponding parameter values. In one example, weights may be multiplied by corresponding parameter values and then summed to determine the eco score for a potential target. Parameter values that are non-numeric may be associated with a predetermined numeric value, which is then weighted for calculating the eco score. Weights may be determined based on the impact a value and its parameter may have on the propensity to participate in the energy program. Weights may be determined by analysis of historic data and may be entered by a user.

The parameters for the models may be referred to as categories and their possible values may be referred to as subcategories. The category of heat type may be broken down into subcategories. For example, subcategories for heat type may be gas, electric or heating oil or other heat type subcategories. An estimated assigned weight for each category and/or subcategory type may be assigned in each model. As shown in FIG. 2, three separate models are calculated based on the weights assigned to each category and sub-category. Another profile category may be house type. House type may also be broken down into subcategories, for example, single family home, duplex/townhome, apartment or other house type categories. The number of categories and subcategories is not limited. Another profile category may be number of residents at an address.

In an example, a model is built to quantify the propensity of a potential target to react favorably to information from a campaign involving consumer self-awareness of energy usage. In a model for such a campaign, profile categories for heat type and housing type may be estimated to be substantial, but not number of residents at an address because the average education of a decision-maker at a household is estimated to be equivalent, regardless of the number of residents. So, in this model, a weight assigned to heat type and house type in the model would be higher than the weight assigned in the number of residents category type. Multiple different models may be developed for any given campaign based on the weights assigned to the categories and subcategories. The number of different models for a given campaign or program is not limited.

FIGS. 3A-B show examples of eco scores for customers 1 and 2 respectively. The eco scores for customer 1 shown in FIG. 3A are 0.2580, 0.2770, and 0.2585 for models 1-3 respectively. The eco scores for customer 2 shown in FIG. 3B are 0.4180, 0.3470, and 0.4585 for models 1-3 respectively. The scores for customer 1 may be lower than the scores for customer 2 because customer 1 has non-electric heating and may thus have less interest in reducing their electricity bill. Also, duplex housing may indicate a shared bill that can result in less interest in a program. Customer 2, however, has electric heating and a single family home with no shared bill and may have a higher score. Also, customer 2 consumes 30% less energy than its peers, and thus may already be enrolled in programs and may be more likely to be interested in additional programs.

FIG. 4 shows an example of a data structure 400 that may be used to organize input data 105. The data structure 400 includes columns for factors and attributes for parameters. The data structure also includes relative values in the columns for value and eco score, and rationales for the relative values. For example, the parameter is housing type (e.g., apartment or house). If the parameter value for housing type is apartment, the eco score for apartment is relatively "lower" when compared to other housing types because renters often do not pay for utilities. Similarly, the value for rent instead of own is "lower". In another example, for the parameter relative usage, if the usage is greater than similar premises, then the value may be "higher" because the customer may desire to enroll in an energy program to reduce their utility bill. Similarly, if % fluctuation is higher, then the eco score may be "higher" because the customer is paying more for electricity. The data structure 400 may be used to prioritize and select parameters for a model. The priorities may be determined based on their estimated impact on participation in energy conservation programs and the values for the parameters. The data structure 400 may include all the parameters that are available for building a model. The data structure 400 may be updated as parameters are added or removed or modified.

Figure 5:
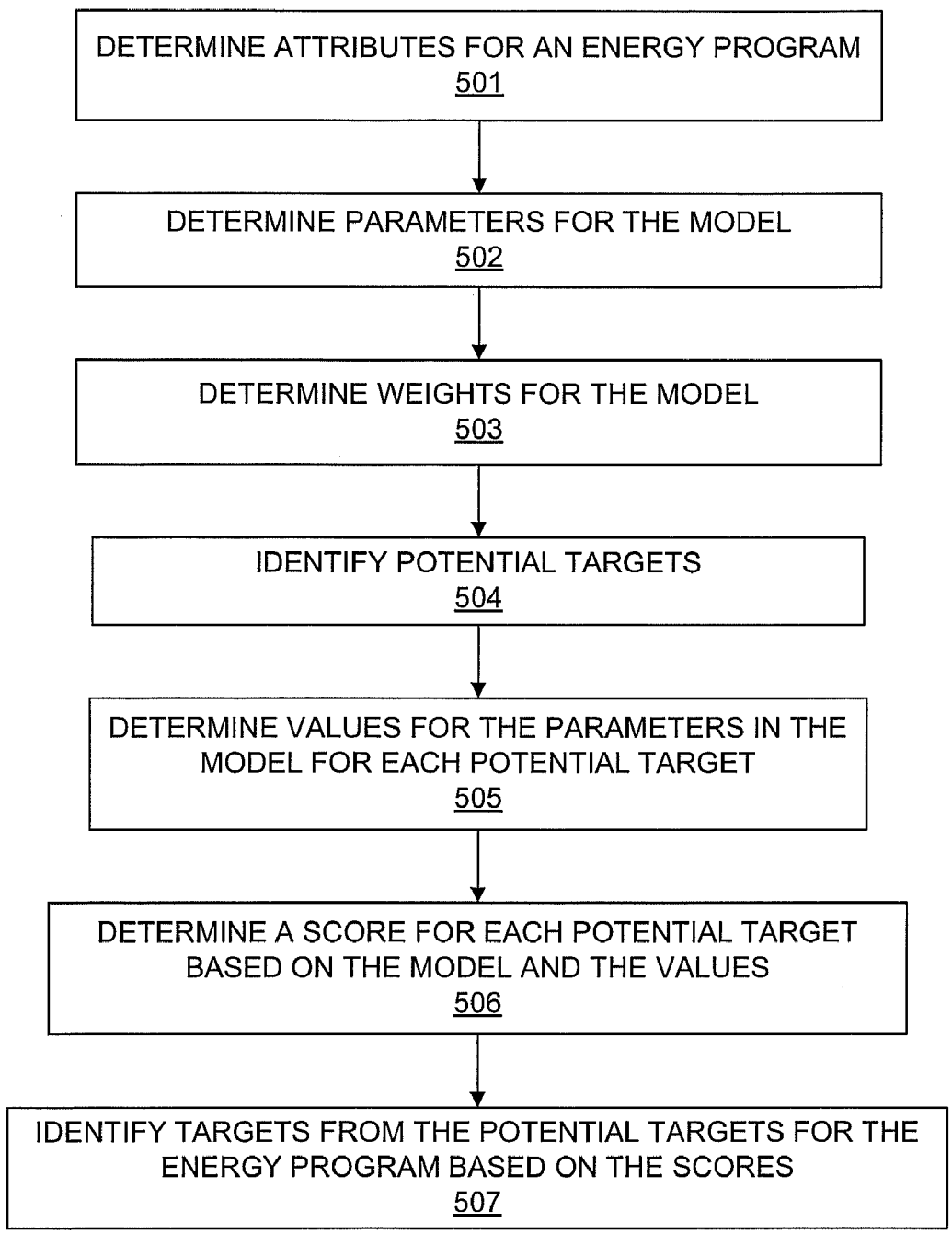
FIG. 5 illustrates a method for performing ESA, according to an embodiment.

FIG. 5 illustrates a method 500 for performing ESA according to an embodiment. The method 500 is described with respect to the ESA system 100, shown in FIG. 1, by way of example and not limitation, and this method may be performed in other systems.

At step 501, the factor profile initiator 101 determines attributes for an energy program. The attributes may include characteristics and goals of the energy program. For example, an energy program may have a goal of reducing power consumption during peak demand time periods. The characteristics may include implementing smart metering systems to manage demand during peak demand periods and advantages to the customer of reduced cost for utility bills. Another program may have a goal of increasing use of renewable energy. Characteristics may include educating customers regarding environmental advantages and availability of subsidies or tax incentives for implementing renewable energy systems, such as solar or wind systems. The attributes of the energy program may be input by a user through the dashboard 104 and the factor profile initiator 101 stores the attributes in the data storage 107.

At steps 502 and 503, the factor profile initiator 101 builds a model for the energy program based on the attributes determined at step 501. The model is used to estimate the propensity of potential targets to participate or favorably receive and react to the energy program. For example, at step 502, the factor profile initiator 101 determines parameters for the model. The factor profile initiator 101 may compare parameters in the data structure 400 with the attributes of the energy program to identify parameters that match the attributes. The data structure 400 may identify high priority parameters and a certain percentage of the parameters selected for the model may be high priority parameters. A user of the ESA system 100 may also select parameters. The factor profile initiator 101 may select an initial set of parameters for the model and a user may review and modify the set to create a final set of parameters for the model.

At step 503, weights are determined for the parameters selected at step 502. The weights may be predetermined and taken from the data structure 400, or the weights may be provided by a user. The model is stored in the data storage 107.

At step 504, potential targets are identified. For example, an input of a utility customer data table containing data fields for a plurality of potential targets including target identities is received at the ESA system 100. The data table may be transmitted from the utility customer database 106 or another system to the ESA system 100. Categories and subcategories of parameters associated with customers may be included.

At step 505, the ESA system 100 determines values for the parameters in the model for each potential target. Examples of values are shown in FIGS. 2 and 3A-B. The values for example are received via a network which may include the Internet. The values may be stored and retrieved from a database. The values may be part of the input data 105. The values may include measurements and data gathered from smart metering systems, which are transmitted to the ESA system 100.

At step 506, the scoring module 102 determines a score for each potential target based on the model and the values. In one example, the potential targets are customers or a subset of customers of a utility company. For example, a subset of customers that may have a higher interest in the program are selected. For example, businesses instead of private individuals are selected as potential targets, or individuals that own instead of rent are selected as potential targets. The utility company or another entity may be implementing the energy program.

The score is calculated for each potential target according to parameter values and weights for the parameters. The score may include one or more of an eco score, an efficiency score, and a composite score. In one example, weights may be multiplied by a corresponding parameter values and then combined to determine the eco score. Parameter values that are non-numeric may be associated with a predetermined numeric value, which are then weighted for calculating the eco score.

An efficiency score may be determined as a function of how much impact a potential target's participation in the program will have on the grid. For example, a program designed to reduce power consumption during peak demand periods may result in a higher efficiency and a higher score than a general renewable energy educational program. Also, the amount of power consumed by a potential target is another factor that may be considered for calculating the efficiency score. In one example, the efficiency score may be high, medium or low and is calculated based on one or more factors contributing to efficiency of the grid. In a simplistic example, if 3 factors are considered for determining efficiency and three of the factors have values that suggest a high efficiency, then the efficiency score is set to high. If two factors have values that suggest a high efficiency, then the efficiency score is set to medium; otherwise the efficiency score is set to low. The high, medium and low efficiency scores may be converted to numeric values to determine a composite score or may be used to weight the eco scores to determine a composite score. The composite score is described below.

The scoring module 102 may also calculate a composite score that takes into consideration the targets propensity to participate in a program and efficiency of the program. For example, efficiency of the program may be determined as a function of how much impact a target's participation in the program will have on the grid. For example, a program designed to reduce power consumption during peak demand periods may result in a higher efficiency than a general renewable energy educational program. The composite score may be a calculated from an efficiency score and an eco score. In one example, the scores may be combined to create the composite score. Thus, as described above, the scoring module 102 may calculate a score for individual customers to indicate a propensity towards a specific program. The scoring module 102 may calculate efficiency scores that identify the customers that may have the greatest or significant impact on overall load management. The scoring module 102 may calculate a composite score from the efficiency score and eco score for a customer.

At step 507, the ESA system 100 identifies targets from the potential targets for the energy program based on the scores. For example, the campaign engine 103 determines a ranking of the eco scores for the plurality of potential targets. Rankings may be from highest to lowest score. Targets may be selected that have rankings above a threshold and a listing of actual targets for the energy program are included as campaign data 108. The targets may then be targeted to participate in the energy program. Targeting may include sending information about the energy program and solicitations to join the energy program to the targets. Therefore, resources for promoting the energy program are more efficiently utilized by targeting the entities most likely to participate in the program. The program, however, may be open to entities that were not determined to be targets. The campaign engine 103 may generate reports via the dashboard 104 showing rankings, scores, parameter values and other information.

Technical effects associated with systems and methods associated with an ESA system, such as ESA system 100, includes the collection of input data 105, the production of campaign data 108 and an improved interface in the dashboard 104 giving the ESA system user convenience when entering and/or reviewing data regarding different kinds of data fields and parameters associated with performing ESA. Another technical effect is conservation of energy and/or other resources through the implementation of information campaigns organized utilizing the ESA system.

The eco scores generated using the ESA system provide a technical tool for efficient search, retrieval and evaluation of the propensity of a potential target for subsequent energy programs. The arrangement of data fields, menu items and images on a screen in the dashboard 104 is determined by technical considerations aimed at enhancing the user's ability to manage the technical task of eco score tracking or planning for changes to utility service distribution.

The functions/steps of processing the ESA system data provides information to the user in the form of a technical tool for an intellectual task the user has to master, and hence contributes to the technical solution of a technical problem of efficient search, retrieval and evaluation of potential targets for an energy program.

Furthermore, the systems and methods described herein are generally described with respect to performing eco score analytics for a utility distributing energy for consumption by customers. However, the system and method are applicable to performing eco score analytics for other types of entities, including volunteer projects, charitable foundations, joint ventures between distinct entities and branches or segments of government.

Figure 6:
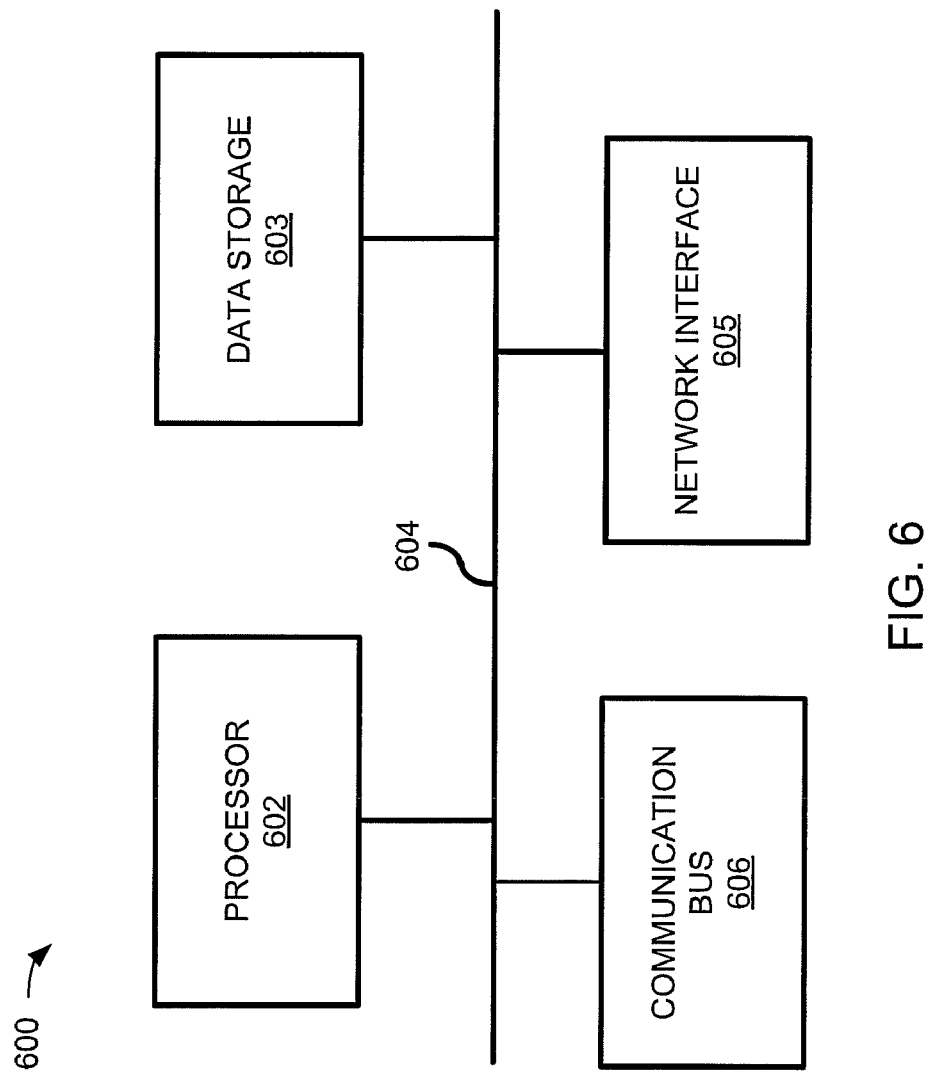
FIG. 6 illustrates a computer system that may be used as a platform for the ESA system, according to an embodiment.

FIG. 6 shows a computer system 600 that may be used as a hardware platform for one or more components of the ESA system 100 shown in FIG. 1. The computer system 600 may be used as a platform for executing one or more of the steps, methods, modules and functions described herein that may be embodied as software stored on one or more computer readable mediums. The computer readable mediums may be non-transitory, such as storage devices including hardware. Also, one or more of the components of the ESA system 100 may be provided in a distributed computing environment, such as a cloud computing environment. The functions of the ESA system 100 may be implemented as a service, which may be available to users via the cloud computing environment. The components of the ESA system 100 may be provided on a server in a network, and/or one or more of the components may be provided on a client device, such as a mobile device, personal computer, etc.

The computer system 600 includes a processor 602 or processing circuitry that may implement or execute software instructions performing some or all of the methods, modules, functions and other steps described herein. Commands and data from the processor 602 are communicated over a communication bus 606. The computer system 600 also includes a computer readable storage device 603, such as random access memory (RAM), where the software and data for processor 602 may reside during runtime. The storage device 603 may also include non-volatile data storage. The computer system 600 may include a network interface 605 for connecting to a network. It will be apparent to one of ordinary skill in the art that other known electronic components may be added or substituted in the computer system 600.

One or more of the functions or steps described herein and one or more of the components of the ESA system 100 described herein may be implemented as computer readable instructions stored on a computer readable medium (e.g., computer readable storage device 603), such as memory and/or other types of data storage that are non-transitory, and executed on a computer system, for example, by processor 602, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art are able to make various modifications to the described embodiments without departing from the scope of the embodiments as described in the following claims, and their equivalents.

What is claimed is:

1. A system configured to perform eco score analytics for an energy program associated with a plurality of potential targets, the system comprising:
  a data storage to store a data structure including a plurality of parameters and information associating the parameters with attributes of the energy program; and
  at least one processor to execute machine readable instructions including:
    a factor profile initiator to determine parameters to be included in a model for the energy program based on the information in the data structure and the attributes of the energy program, and to build a model for the energy program from the determined parameters, wherein the parameters are determined, at least in part, from energy consumption information received via a network from smart meter systems associated with at least a subset of the plurality of potential targets;
    a scoring module to determine values for the parameters in the model and to determine a score for each of the potential targets based on the model and the values for the parameters in the model, wherein each score represents a composite of an eco score representing an estimate of a propensity of the potential target to participate in the energy program, and an efficiency score representing an estimate of an impact the potential target is operable to have on load management of power demand; and
    a campaign engine to determine a ranking of the scores for the plurality of potential targets, wherein at least a subset of the potential targets is selected as targets for the energy program based on the rankings; and
  the at least one processor is to further execute the machine readable instructions to implement, via the network, at least a portion of the energy program for the selected targets for the energy program using power control devices associated with the smart meter systems associated with the selected targets.

2. The system of claim 1, wherein the factor profile initiator is to determine weights for the parameters, and the weights are included in the model for calculating the score for each potential target.

3. The system of claim 1, wherein the system receives an input of a data table containing data fields for the plurality of potential targets including categories and subcategories of the parameters associated with the potential targets, and the factor profile initiator uses the data table to select the parameters for the model.

4. The system of claim 1, comprising a dashboard to enter input data for determining the scores and to present data for the potential targets, the model and the scores.

5. The system of claim 1, wherein the information in the data structure includes factors and attributes for the parameters, relative values for the parameters, rationales explaining the relative values, and priorities for the relative values.

6. The system of claim 1, wherein the information in the data structure is updated as a parameter is added, removed or modified.

7. The system of claim 1, wherein previous participation of the potential targets in different energy programs is tracked and used to determine the scores for the potential targets.

8. A computer-implemented method executed by at least one processor executing machine readable instructions for performing eco score analytics for an energy program associated with a plurality of potential targets, the method comprising:
  determining attributes of the energy program;
  determining, by a computer, parameters to be included in a model for the energy program based on the attributes of the energy program, wherein the parameters are determined, at least in part, from energy consumption information received via a network from smart meter systems associated with at least a subset of the plurality of potential targets;
  building, by the computer, the model for the energy program from the determined parameters;
  determining values for the parameters in the model;
  determining a score for each of the plurality of potential targets based on the model and the values for the parameters in the model, wherein each score represents a composite of an eco score representing an estimate of a propensity of the potential target to participate in the energy program; and an efficiency score representing an estimate of an impact the potential target is operable to have on load management of power demand;
  determining a ranking of the scores for the plurality of potential targets, wherein at least a subset of the potential targets is selected as targets for the energy program based on the rankings; and
  implementing, via the network, at least a portion of the energy program for the selected targets for the energy program using power control devices associated with the smart meter systems associated with the selected targets.

9. The method of claim 8, comprising:
  determining weights for the parameters, and the weights are included in the model for calculating the score for each potential target.

10. The method of claim 8, comprising:
  receiving an input of a data table containing data fields for the plurality of potential targets including categories and subcategories of the parameters associated with the potential targets; and
  using the data table to select the parameters for the model.

11. The method of claim 8, comprising:
receiving input data for determining the scores via a dashboard; and
presenting data for the potential targets, the model and the scores via the dashboard.

12. The method of claim 8, further comprising:
storing, in a data storage, a data structure including the parameters and information associating the parameters with the attributes of the energy program, wherein the information in the data structure includes factors and attributes for the parameters, relative values for the parameters, rationales explaining the relative values, and priorities for the relative values.

13. The method of claim 12, wherein the information in the data structure is updated as a parameter is added, removed or modified.

14. The method of claim 8, comprising:
tracking previous participation of the potential targets in different energy programs; and
determining the scores for the potential targets based on the previous participation.

15. A non-transitory computer readable medium storing machine readable instructions that when executed by a processor perform eco score analytics for an energy program associated with a plurality of potential targets, the machine readable instructions comprising instructions to:
determine attributes of the energy program;
determine parameters to be included in a model for the energy program based on the attributes of the energy program, wherein the parameters are determined, at least in part, from energy consumption information received via a network from smart meter systems associated with at least a subset of the plurality of potential targets;
build the model for the energy program from the determined parameters;
determine values for the parameters in the model;
determine a score for each of the plurality of potential targets based on the model and the values for the parameters in the model, wherein each score represents a composite of an eco score representing an estimate of a propensity of the potential target to participate in the energy program and an efficiency score representing an estimate of an impact the potential target is operable to have on load management of power demand;
determine a ranking of the scores for the plurality of potential targets, wherein at least a subset of the potential targets is selected as targets for the energy program based on the rankings; and
implement, via the network, at least a portion of the energy program for the selected targets for the energy program using power control devices associated with the smart meter systems associated with the selected targets.

* * * * *